(12) United States Patent
Shelley et al.

(10) Patent No.: US 7,720,459 B2
(45) Date of Patent: May 18, 2010

(54) METHOD OF REMOTE COLLECTION OF DATA FOR THE ACCOUNT OF AN ENTITY, USING A THIRD PARTY DATA COMMUNICATION NETWORK, E.G. FOR AUTOMATIC METER READING

(75) Inventors: Christopher Shelley, Melton Park (GB); Christopher Saunders, Charsfield (GB)

(73) Assignee: Actaris UK Limited, Manchester (GB)

( * ) Notice: Subject to any disclaimer, the term of this patent is extended or adjusted under 35 U.S.C. 154(b) by 655 days.

(21) Appl. No.: 11/158,914

(22) Filed: Jun. 22, 2005

(65) Prior Publication Data
US 2006/0023853 A1 Feb. 2, 2006

(30) Foreign Application Priority Data
Jul. 1, 2004 (GB) .................. 0414771.6

(51) Int. Cl.
*H04M 11/00* (2006.01)
(52) U.S. Cl. .................. 455/405; 455/450; 455/452.1; 455/454
(58) Field of Classification Search .......... 455/405, 455/414.1, 466, 450, 452.1, 454
See application file for complete search history.

(56) References Cited

U.S. PATENT DOCUMENTS

| | | | | |
|---|---|---|---|---|
| 4,881,072 | A | 11/1989 | Carnel | 340/870.02 |
| 5,548,633 | A | 8/1996 | Kujawa | 379/93 |
| 5,742,512 | A | 4/1998 | Edge et al. | |
| 6,133,850 | A | 10/2000 | Moore | 340/870.02 |
| 6,369,719 | B1 | 4/2002 | Tracy et al. | 340/870.02 |
| 6,741,848 | B2 * | 5/2004 | Timonen et al. | 455/405 |
| 6,988,182 | B2 | 1/2006 | Teachman et al. | |
| 7,202,800 | B2 * | 4/2007 | Choi | 340/870.02 |
| 7,262,709 | B2 | 8/2007 | Borleske et al. | |

(Continued)

FOREIGN PATENT DOCUMENTS

EP 0778688 11/1996

(Continued)

OTHER PUBLICATIONS

International Search Report- Nov. 4, 2004.

(Continued)

*Primary Examiner*—Temica M Beamer
(74) *Attorney, Agent, or Firm*—Dority & Manning, P.A.

(57) ABSTRACT

The remote collection of data for the account of an entity (2) uses a data communications network (26) operated by a third party (28) with respect to the entity. It is characterised in that the access to said data communication network (26) by the entity for remote data collection is governed dynamically by said third party (28) as a function of the spare data-carrying capacity of the communications network. The third party (28) may thus grant the entity (2) access to the communications network (26) when the level of the third party's own data traffic on said network is below a determined threshold value, corresponding to an occupation below peak capacity. The approach finds applications notably in the field of automatic meter reading (AMR), where the network operator, e.g. a cellular telephone operator, is a third party with respect to the utilities company (2), and the collected data is meter reading data from remote meters (14a-14g) sent via GPRS interfaces (16a-16d).

17 Claims, 1 Drawing Sheet

U.S. PATENT DOCUMENTS

| | | | |
|---|---|---|---|
| 7,289,887 B2 * | 10/2007 | Rodgers | 700/295 |
| 2003/0048199 A1 | 3/2003 | Zigdon et al. | 340/870.02 |
| 2004/0113810 A1 | 6/2004 | Mason, Jr. et al. | 340/870.02 |
| 2007/0296607 A1 | 12/2007 | Salser, Jr. | |

FOREIGN PATENT DOCUMENTS

| | | |
|---|---|---|
| GB | 2374760 A | 4/2001 |
| GB | 2416640 A | 2/2006 |
| WO | WO9610313 | 4/1996 |

OTHER PUBLICATIONS

European Search Report- Oct. 21, 2005.

International Search Report for PCT International Application No. PCT/US2009/045381 mailed Nov. 10, 2009.

Written Opinion of the International Searching Authority for PCT International Application No. PCT/US2009/045381 dated Nov. 10, 2009.

* cited by examiner

METHOD OF REMOTE COLLECTION OF DATA FOR THE ACCOUNT OF AN ENTITY, USING A THIRD PARTY DATA COMMUNICATION NETWORK, E.G. FOR AUTOMATIC METER READING

RELATED APPLICATION

This application is related to and claims the benefit of priority from United Kingdom Patent Application No. 0414771.6, filed on Jul. 1, 2004, the entirety of which is incorporated herein by reference.

FIELD OF THE INVENTION

The present invention relates to the field of remote data collection, in which the collected data is transported at least partially through a network operated by a third party with respect to the recipient and/or source of the data. The data in question can e.g. relate to a utilities consumption measured by a meter in accordance with the field of automatic meter reading (AMR).

BACKGROUND

In the context of AMR, most existing techniques use either:
i) a proprietary network installed wholly for the purpose of reading meters, such as a bespoke radio network, or
ii) a pre-existing network wholly installed to support commodity delivery. An example of the latter type of network is the power line carrier (PLC) network, which uses existing electricity power supply lines to confer them the additional role of transporting electricity meter (or other meter) readings.

Other known techniques use a third party network, typically the public switched telephone network (PSTN) lines, to read meters at preselected times and at preselected frequencies (e.g. monthly). In this case, the meters can be polled from a master system, i.e. the meters are accessed and ordered to send their readings, or the meters can contact the master station at a set time and deliver their meter readings.

Approach i) above suffers from the problem that a suitable network must be maintained solely for the purposes of reading a meter, and therefore the cost of maintaining and installing the network is normally not recovered from the savings made in automatic meter reading, or at least the payback is too long to make the investment viable.

Approach ii) above is a high cost solution, since the network provider typically does not extract sufficient revenue from the meter reading activity to offer low enough tariffs for making automated meter reading cost effective. Because the readings take place at a preselected time, they do not take into account the current level of network usage at that time. The networks in use are not optimised for meter reading, and therefore do not offer a cost effective solution for that application.

In an attempt to minimise AMR data traffic over a radio network, it has been proposed in patent document U.S. Pat. No. 6,133,850 to provide utility meters with a function of internally storing pricing information, allowing the meters to calculate for themselves billing cost locally on the basis of the downloaded pricing information. The totalised billing determined by the meter is sent in place of the utility consumption data, thereby allowing the frequency of data exchanges to be reduced.

Patent document US 2003/0048199 describes a modular radio network for AMR applications, in which base stations are interconnected by an IP network, and the collected information is grouped at a central station for later access.

Patent document EP-A-0 77 8688 more particularly addresses the problem of software and firmware compatibility among meter manufacturers and utilities operators, whereby existing commercial software packages can be used without reconfiguring or relinking the system.

OBJECTS AND SUMMARY

In view of the foregoing, the present invention proposes a new approach by which remote data collection can be implemented using a third party network substantially without impacting on the quality of service for that network's primary application, while adequately satisfying the data collection requirements.

More particularly, the invention provides, according to a first object, a method of remote collection of data for the account of an entity, using a data communications network operated by a third party with respect to the entity, characterised in that the access to the data communications network by the entity for remote data collection is governed dynamically by the third party as a function of the spare data-carrying capacity of the communications network, said third party signalling to said entity at least one dynamically variable condition of use of said network, relating to at least:
  a geographical or topographical zone of said network authorised for access by said entity, and/or
  a quantity of data authorised to be transported on said network.

Advantageously, the third party grants the entity access to the network when the level of the third party's own data traffic on the communications network is below a determined threshold value, corresponding to an occupation below peak capacity.

In a preferred embodiment, the third party sends to the entity a first signal when it grants the entity access to the communications network, and a second signal when it ceases to grant the entity access to the network.

The third party can signal to the entity data indicative of a tariff for transmission of data on the network.

The entity can be a utilities operator distributing a metered utility, or a representative thereof, and the data can reflect a consumption of a utility measured by a meter and can be read by an automatic meter reading (AMR) technique.

The network can be a cellular telephone wireless network, the third party being the cellular wireless network operator.

At least some items of data sent by the entity over the network can be formatted according to a proprietary message format, or according to message format that is standardised according a protocol managed by the third party.

The network can be used to convey data bidirectionally between a source of the data to be collected (e.g. a utilities meter) and a destination of the data to be collected, the network thereby serving for interrogating the sources by a signal sent thereto from the destination, and/or for sending data such as configuration information to the data source.

The first signal and/or the second signal can be conveyed by a data communications path separate from the communications network.

The data can be collected successively from different data sources according to a determined order of priority.

According to a second object, the invention relates to a method of remote automatic meter reading by an entity, using a data communications network operated by a third party with respect to the entity, characterised in that the entity accesses the data communications network for automatic meter reading at periods dynamically determined by the third party as a function of the spare data-carrying capacity of the communications network, said third party signalling to said entity at least one dynamically variable condition of use of said network, relating to at least:

a geographical or topographical zone of said network authorised for access by said entity, and/or a quantity of data authorised to be transported on said network.

The automatic meter reading operations over the network can be managed in accordance with any other aspect of the method according to the first object, the remotely collected data being automatic meter reading data from remote meters.

The method can comprise the step of establishing an order of priority of meters to be read, and of reading meters, when the communications network is made available for access, starting with the highest priority meter(s), e.g. for which the time interval since a previous reading is longest, or which has/have been flagged for a reading, such as in the event of an imminent bill.

According to a third object, the invention relates to a method of managing a data communications network, wherein the operator of the network grants network access to an entity for the purpose of remote meter reading, the network operator being a third party with respect to that entity, characterised in that the network operator governs access to the data communication network, for remote data collection, dynamically as a function of the spare data-carrying capacity of the communications network, and signals to said entity at least one dynamically variable condition of use of said network, relating to at least:

a geographical or topographical zone of said network authorised for access by said entity, and/or a quantity of data authorised to be transported on said network.

According to a fourth object, the invention relates to a data carrier containing executable code which, when executed on a processor, carries out the method according to any aspect of the first, second or third object.

According to fifth object, the invention relates to a system for the remote collection of data for the account of an entity, using a data communications network operated by a third party with respect to the entity, characterised in that it comprises means for governing access to the data communications network by the entity for remote data collection dynamically as a function of the spare data-carrying capacity of the communications network and means for signalling to said entity (2) at least one dynamically variable condition of use of said network (26), relating to at least:

a geographical or topographical zone of said network authorised for access by said entity, and/or a quantity of data authorised to be transported on said network.

BRIEF DESCRIPTION OF THE DRAWINGS

The invention and its advantages shall become more apparent from reading the following detailed description of a preferred embodiment of the invention, given purely by way of a non-limiting example, with reference to the sole FIGURE, which is a simplified block diagram illustrating some functional units used in a preferred embodiment of the invention.

DETAILED DESCRIPTION

Figure 1:
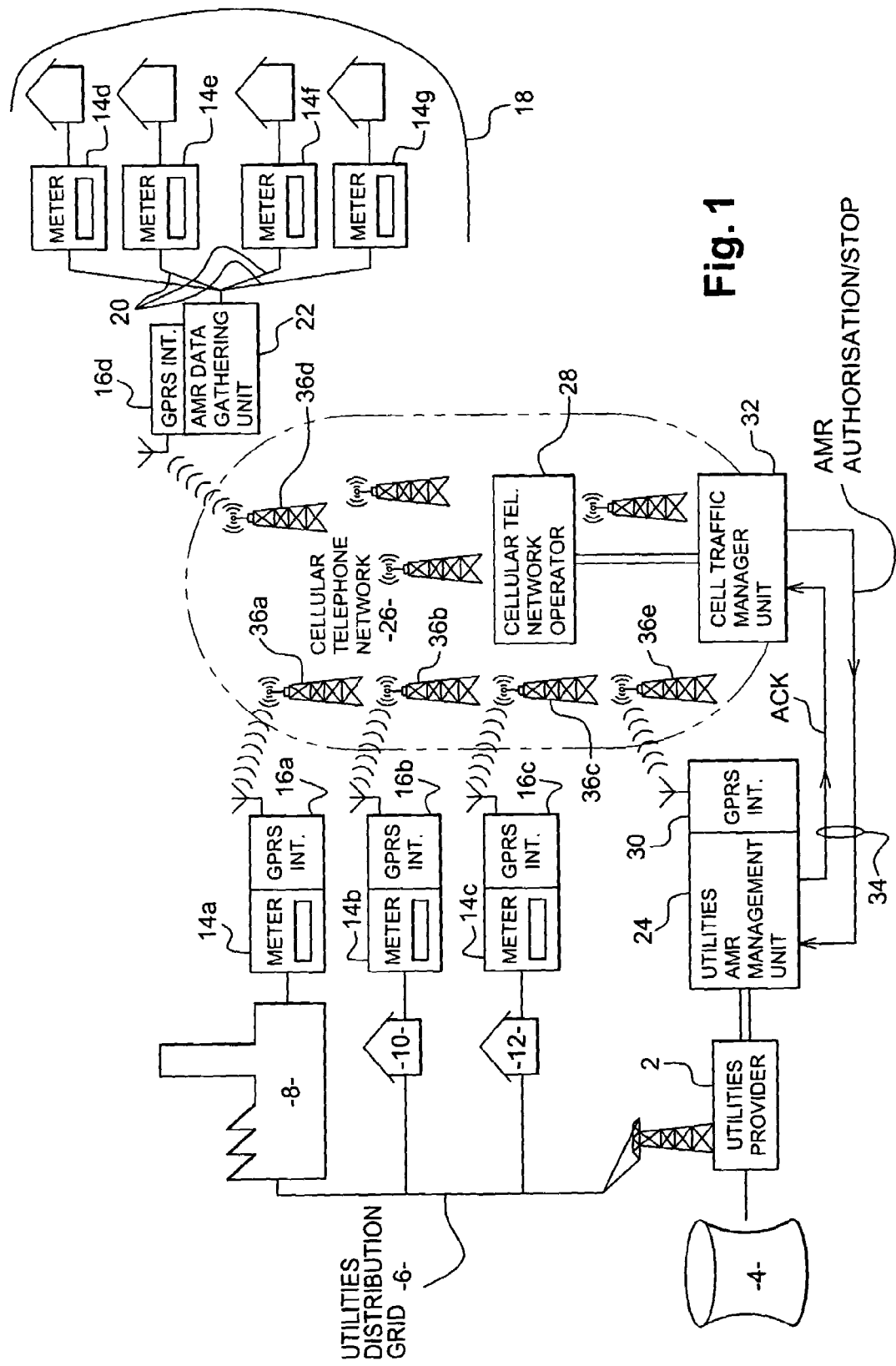

The operating environment 1 illustrated in FIG. 1 is based on an electricity company 2 (symbolised by a cooling tower 4) forming an example of a utilities provider. The electricity company distributes its utilities (electricity) over a power grid 6 to a number of individual customers. In the FIGURE, the customers are symbolised by an industrial plant 8 and two separate houses 10 and 12, each having their own utilities (electricity) meter, respectively designated 14a, 14b and 14c. Each meter has a built-in or attached wireless communications module, respectively designated 16a, 16b and 16c, by which it can transmit its meter reading data in accordance with an automatic meter reading (AMR) technique.

In addition, the operating environment 1 encompasses groups of meter users—symbolised by a cluster 18 of individual houses—each having their own utilities meter 14d-14g which connect to a common wireless communications module 16d. The connection between each of the meters 14d-14g to that module 16d is typically implemented by a cabling system 20 that is either specific to the AMR function or based on existing communications lines, such as the telephone network. The AMR data received from the different meters 14d-14g of the cluster 18 are managed by a local AMR data gathering unit 22, where they are individualised and formatted for sending through the wireless communications module 16d. Typically, the data transfer is effected in real time: upon receiving a request for data, the data gathering unit 22 interrogates the corresponding meter(s) and sends back the data to the utilities AMR management unit 24. Physically, the AMR gathering unit 22 may be a stand-alone unit or—more typically—it may be incorporated into one of the associated meters 14d-14g.

In the example, the meter reading data are sent to a utilities AMR management unit 24 of the utilities provider 2, by means of a cellular telephone network 26 using the GPRS (general packet radio service) protocol. The wireless communications modules 16a-16d accordingly take the form of respective GPRS interfaces. Other protocols and communications standards can, of course, be envisaged for sending the meter reading data, such as GSM (global system for mobile communications), UMTS (universal mobile telecommunications system), etc.

The cellular telephone network 26 is owned by a cellular telephone network operator 28, which is a legal and commercial entity that is separate from the utilities provider 2. Accordingly, the cellular telephone network 26 constitutes a third party network with respect to the utilities provider 2.

The utilities provider 2 may or may not operate the management unit 24 itself, depending on how the AMR system is organised. For instance, the AMR management unit 24 can be operated by a sub-contractor of the utilities provider 2, that sub-contractor being a specialist data management company.

In order to communicate over the cellular telephone network 26, the wireless meters' communications interfaces 16a-16d have their own GPRS telephone numbers assigned by the network operator, and comprise the radio and base band layers of a GPRS cellular telephone terminal. The utilities AMR management unit 24 is likewise equipped with a GPRS interface 30, by means of which it can call selected meter GPRS interfaces 16a, 16, 16c, 16d to establish a bidirectional data link to interrogate the associated meters and download their meter reading data over the GPRS network.

As explained further, the GPRS link can also serve to upload configuration data to the meters 14a-14g and/or to their interfaces 16a-16d, 22.

AMR operations using the cellular telephone network 26 are conducted only when the latter is not under peak load. To this end, the utilities AMR management unit 24 is in communication with a cellular traffic manager unit 32, which belongs to the GPRS telephone network operator 28 and monitors the traffic load on the GPRS network. When that unit 32 detects that the load on the network 26 is below a predetermined threshold level, it sends an AMR AUTHORISATION signal to the utilities AMR management unit 24. In response, the utilities AMR management unit 24 sends an acknowledgement signal ACK, possibly with other information such as the amount of data it has scheduled to collect, and begins the remote reading (polling) of the meters concerned.

The aforementioned AMR AUTHORISATION and ACK signals are in this example exchanged through a cable connection 34, which can be provided specifically for that purpose, or based on an existing infrastructure, such as the public telephone lines. In a variant, these signals are exchanged through the cellular telephone network 26, via the GPRS interface 30 at the level of the utilities AMR management unit 24.

The utilities AMR management unit 24 maintains a database of all meters to be read. Advantageously, that database is organised so that it carries out the readings starting with the highest priority meter (typically one that was read longest time ago, or one that has been flagged for a read due to another event, such as an imminent bill). The AMR management unit 24 continues to interrogate (poll) the meters until it receives a STOP signal from the cellular traffic manager unit 32 via the cable connection 34. This STOP signal would normally be issued when the traffic on the network has risen above the aforementioned predetermined threshold level. The utilities AMR unit 24 resumes its meter readings only upon receiving a new AUTHORISATION signal. In this way, the third party network operator 28 can dynamically establish the time slots during which AMR operations can be allowed, respectively by sending an AMR AUTHORISATION to start a time slot and an AMR STOP signal to end that time slot. Advantageously, the network operator 28 creates these time slots to coincide with periods of low, or sub-peak network levels of data traffic on the network.

Over a period of time, provided there is sufficient surplus network capacity, all the meters will be read.

In this way, the cellular telephone network operator 28 can maintain usage of its network 26 with priority for its own primary applications, i.e. telephony and related services it provides to its subscribers and customers, while opening its network for other, external, applications, such as AMR, all the while the network has the spare capacity to accommodate them in parallel, and only when it has that spare capacity. By issuing the aforementioned AMR AUTHORISATION and STOP signals, the operator 28 effectively maintains a dynamic control of the moments when its network 26 can be accessed for those other applications, as a function of its spare capacity. Accordingly, the network operator 28 can maintain its quality of service for its own priority applications while ensuring optimum allocation of its spare, off-peak, bandwidth for other applications, from which it can also gain revenue.

In exchange, the utilities operator 2 can obtain special tariffs for its AMR data traffic on the GPRS network 26, and can thus obtain the lowest costs for its meter reading operations. The time constraints imposed by the network operator for the AMR operations are not a problem, as AMR is a typical example of a low priority data collection operation that can be deferred and interrupted in return for a reduced data transport cost.

The concept described is amenable to many variants and can be implemented to varying degrees of sophistication. In a simple case, the authorisation to use the network for AMR is just a yes/no signal. In the case of FIG. 1, this could be in the form of a binary signal where a logic 1 corresponds to AMR AUTHORISATION and a logic 0 corresponds to AMR STOP. All the while that signal is at logic 1, the utilities AMR management unit 24 has free access to the use the cellular telephone network 26. Conversely, as soon as the AMR STOP signal is sent, the AMR management unit 24 stops its automatic meter reading operations to free the cellular telephone network so that the latter can accommodate for its peak demand.

In other variants, the AMR AUTHORISATION signal can be accompanied with dynamic data indicating specific conditions of use applicable to that particular authorisation, such as:

MAX LOAD data, which can be a numerical field indicating the maximum authorised amount of bandwidth allocated for the AMR operation currently authorised. The value of MAX LOAD can be updated during the authorisation period to adapt to current network allocation possibilities;

TARIFF data, which can be a numerical field indicating the charge, in appropriate units, for using the network, where that charge is subject to fluctuations. The TARIFF data may include modulations or multiple charge levels, e.g. charge N1 Euros per MB (Mega byte) for 0 to 100 MB, charge N2 Euros per MB for 101 MB to 250 MB, etc.;

AREA data, which is a code field indicating geographical regions of the cellular telephone network 26 from which AMR data can be collected. As far as the cellular network traffic manager unit 32 is concerned, this data is dependent on the local loads on the cell towers 36a-36e and relay stations. For instance, if each customer 8, 10, 12 and cluster 18 shown in FIG. 1 are served by a separate cell tower, respectively 36a, 36b, 36c and 36d and local traffic is relatively low on cell towers 36a, 36b and 36d but is already close to peak capacity on cell tower 36c, then the AREA data shall exclude from authorisation the area covered by the latter cell tower.

On a separate account, the AUTHORISATION signal shall be influenced by the local traffic at the level of the cell tower 36e from which depends the utilities AMR management unit 24, and to which the AMR data converges. If the dependency of the utilities AMR management unit 24 on a single cell tower 2436e leads to congestion problems, several solutions can be envisaged. For example, the GPRS interface 30 of the utilities AMR management unit 24 can be subdivided into multiple GPRS data collection interfaces distributed over a geographical area covered by several different cell towers, each available for calling the meters' GPRS interfaces 16a-16d in accordance with a flexible management scheme. This scheme can be made to select only those GPRS interfaces that are in an area of low local network activity for optimum cost conditions and/or for operating in parallel to increase collection speed, and possibly take full advantage of time-limited reduced rates. The data acquired from the distributed multiple GPRS data collection interfaces can then be sent in batches to the utilities AMR management unit 24, through the cellular telephone network 26 during an active AUTHORISATION signal. Alternatively, the data acquired from the distributed multiple GPRS interfaces can be sent to the utilities AMR management unit 24 through:

a third party network that is different from the one of the cellular telephone network 26, a network maintained solely for the purposes of transferring utility data,—the Internet, a wireless or cable Intranet, The techniques for coupling a utilities meter to a wireless interface, such as a GPRS interface, are in themselves accessible to the person skilled in the art of AMR, and shall not be described here for reasons of conciseness.

Under a typical operating protocol, the utilities meters 14a-14g and associated GPRS interfaces 16a-16d are not given the initiative of issuing a call, and thus operate as slave modules that are polled for meter reading.

In the embodiment, a meter reading operation involves the following steps:

i) the utilities AMR management unit 24 receives an AUTHORISATION signal (logic level 1) from the cellular traffic manager unit 32, then:

ii) the utilities AMR management unit accesses a database which contains: all the meters under management, their GPRS call numbers, and an order of priority for reading, starting with the highest priority meter (typically the ones that were read the longest time ago, or ones that have been flagged for a read due to another event, e.g. an imminent bill). If an AREA data signal or equivalent geographical discrimination is implemented, as mentioned above, the database shall also index the meters with corresponding geographical areas as a selection criterion;

iii) the utilities AMR management unit picks from the database the meter having the highest priority for reading, or the n meters having the highest priority (n>1) if it has an n-channel parallel calling capability;

iv) the utilities AMR management unit calls the corresponding GPRS number(s) to establish a wireless telephone link with the called meter GPRS interface(s);

v) once the communication is established, the utilities AMR management unit sends to the addressed AMR meter interface(s) respective messages containing code ordering the meter to access its memory portion where totalised utility consumption data is stored. This data can be e.g. kWh, kVArh, kVAh (for a case of electricity metering). The accumulated energy information may also be represented by one or more rate registers, where the rate register records consumption for a predefined portion of the day. The consumption submitted to AMR may also be accumulated energy recorded over predefined intervals throughout the day. For example, and typically, the meter may, for each day, record 48 portions of data, each representing the consumption during respective half-hour periods. This is typically referred to as a "time of use" data. The AMR data can also be direct cost information if the meter is loaded with charge information;

vi) in response, the meter creates a data message according to a determined format, containing that totalised utility consumption data in its payload, and sends that message as an outgoing message to the utilities AMR management unit 24;

vii) upon having correctly received the contents of that packet, the utilities AMR management unit 24 sends a message to the meter indicating that the data has been received, and viii) enters that totalised utility consumption data into the database against the corresponding meter.

If the totalised utility consumption data is not correctly received, or appears to be erroneous, the utilities AMR management unit 24 can repeat its outgoing message to initiate another meter reading operation on the same meter.

The above operations are repeated for successive meters in the order of priority until either: i) all the meters have been read or ii) a STOP message is received from the cell traffic manager unit 32.

In the case of accumulated data being sent in the AMR messages from the meters, the utilities AMR management unit 24 derives the consumption by subtracting the last reading (stored in its database) for the meter in question from the new reading received from that meter, which continues to accumulate the metered value.

In the case of time of use data, the meter typically has a revolving buffer where the oldest day's data is overwritten, assuming that the latter data has been read in an AMR message.

If the operations are interrupted in response to a STOP message, then the utilities AMR management unit 24 sets a pointer on the list of meters in the database, just after the last successfully read meter(s), indicating the position of the next meter(s) to be read when a new active AMR AUTHORISATION signal is received.

In addition to the interrogation messages of step v) above, the utilities AMR management unit 24 can also use the bidirectional data communication possibility over the third party network 26 to send other messages with configuration information to the GPRS interfaces 16a-16d, meters 14a-14g, or AMR data gathering units 22, such as:

administrative information, such as tariff switching times, software/firmware update code and data, diagnostic messages, to extract return information connected with meter and/or interface maintenance, etc.

The third party network 26 is thus used for two-way communication between the utilities AMR management unit and the utilities client devices, namely the meters 14a-14g and their AMR interfaces 16a-16d, and AMR data gathering interfaces 26.

Advantageously, the messages for interrogating the meters and/or those sent by the meters are formatted using a proprietary format, or using a format that is standard to the third party network 26 being used, e.g. SMS messages for a GSM protocol, or a GPRS compatible data format for the case of a GPRS network as in the illustrated example.

It will be apparent that the teachings given above have a very broad scope for implementing variant and equivalent embodiments.

For instance, the third party network can be of any type, whether it be wireless or cable based (electrical, electronic, optical, etc.), and can be implemented with any data protocol. The transfer of data can be effected either wholly through the third party network (as in the described in the embodiment) or using a third party network for just part of the route from the source to the destination. For instance, the meters of a housing estate or district can be sent to a grouping point by a first network, such a cable system, public telephone network, or a proprietary data line, forming a first part of the route. Each grouping point can then be served by a common interface from which the meter data is collected by a third party network covering the remainder of the route. According to another possibility, the third party network can pass the data from each meter or aforementioned grouping point, up to one or several data delivery points. The data from the data delivery point(s) can then be sent to the end destination, i.e. the utilities AMR management unit 24, through any other network or means.

Also, the invention can apply to substantially any metered utility susceptible of AMR: electricity, gas, water, heat transfer fluid (e.g. for central heating), services (e.g. metering of usage of domestic appliances, vehicles, media services, etc.), delivery of commodities such as industrial or domestic substances in gaseous, liquid, granular or powdered form over a distribution pipeline system, etc.

The invention also has scopes beyond the field of AMR, and notably whenever data needs to be collected from a remote point, such as in: weather stations, gas sensor stations, land surveying points, agricultural sensors, remote image recorders, etc.

The invention claimed is:

1. A method of remote collection of data for the account of an entity, using a data communications network operated by a third party with respect to said entity, said method comprising the steps of,
   dynamically governing access to said data communication network by said entity for remote data collection by said third party as a function of spare traffic data-carrying capacity of said communications network; and
   signalling by said third party to said entity at least one dynamically variable condition of use of said network, relating to at least one of or both
      a geographical or topographical zone of said network authorised for access by said entity, and
      a quantity of data authorised to be transported on said network.

2. Method according to claim 1, wherein said third party grants said entity access to said communications network when the level of the third party's own data traffic on said network is below a determined threshold value, corresponding to an occupation below peak capacity.

3. Method according to claim 1, wherein said third party sends to said entity a first signal (AMR AUTHORISATION) when it grants said entity access to said communications network, and a second signal (AMR STOP) when it ceases to grant said entity access to said communications network.

4. Method according to claim 1, wherein said third party signals to said entity data indicative of a tariff for transmission of data on said communications network.

5. Method according to claim 1, wherein said entity is a utilities operator distributing a metered utility, or a representative thereof, and said data reflects a consumption of a utility measured by a meter and is read by an automatic meter reading technique.

6. Method according to claim 1, wherein said communications network is a cellular telephone wireless network, said third party being the cellular radio network operator.

7. Method according to claim 1, wherein at least some items of data sent by said entity over said network are formatted according to a proprietary message format.

8. Method according to claim 1, wherein at least some items of data sent by said entity over said network are formatted according to a message format that is standardised according to a protocol managed by said third party.

9. Method according to claim 1, wherein said communications network is used to convey data bidirectionally between a source of said data to be collected and a destination of said data to be collected, said network thereby serving for interrogating said sources by a signal sent thereto from said destination and/or for sending data such as configuration information to said data source.

10. Method according to claim 3, wherein either one or both of said first signal (AMR AUTHORIZATION) and said second signal (STOP) is conveyed by a data communications path separate from said communications network.

11. Method according to claim 1, wherein said data is collected successively from different data sources according to a determined order of priority.

12. Method of remote automatic meter reading by an entity, using a data communications network operated by a third party with respect to said entity, said method comprising the steps of:
   accessing by said entity said data communications network for automatic meter reading at periods dynamically determined by said third party as a function of spare data-carrying capacity of said communications network; and
   signalling by said third party to said entity at least one dynamically variable condition of use of said network, relating to at least one of or both:
      a geographical or topographical zone of said network authorised for access by said entity, and
      a quantity of data authorised to be transported on said network.

13. Method according to claim 1, wherein the remote collection of data is automatic meter reading operations over said network, the remotely collected data being automatic meter reading data from remote meters.

14. Method according to claim 12, further comprising the steps of establishing an order of priority of meters to be read, and of reading meters, when said communications network is made available for access, starting with the highest priority meter(s).

15. Method of managing a data communications network, wherein the operator of said network grants network access to an entity for the purpose of remote meter reading, said network operator being a third party with respect to said entity, said method comprising the steps of:
   governing access by said network operator to said data communications network for remote data collection dynamically as a function of spare traffic data-carrying capacity of said communications network, and
   signalling to said entity at least one dynamically variable condition of use of said network, relating to at least one of or both:
      a geographical or topographical zone of said network authorised for access by said entity, and
      a quantity of data authorised to be transported on said network.

16. A system for the remote collection of data for the account of an entity, using a data communication network operated by a third party with respect to said entity, said system comprising:
   means for governing access to said data communication network by said entity for remote data collection dynamically as a function of spare traffic data-carrying capacity of said communications network; and
   means for signalling to said entity at least one dynamically variable condition of use of said network, relating to at least one of or both:
      a geographical or topographical zone of said network authorised for access by said entity, and
      a quantity of data authorised to be transported on said network.

17. Method according to claim 14, wherein said steps of establishing an order of priority of meters to be read is based on any one of; the meter which the time interval since a previous reading is longest, or the meter(s) which have been flagged for a reading, such as in the event of an imminent bill.

* * * * *